United States Patent [19]

Sugiyama

[11] Patent Number: 4,641,204
[45] Date of Patent: Feb. 3, 1987

[54] RECORDING AND REPRODUCING SYSTEM FOR RECORDING BOTH ANALOGUE AND DIGITAL INFORMATION ON AND FROM A DISC

[75] Inventor: Hiroyuki Sugiyama, Isehara, Japan

[73] Assignee: Victor Company of Japan, Ltd., Yokohama, Japan

[21] Appl. No.: 640,757

[22] Filed: Aug. 14, 1984

[30] Foreign Application Priority Data

Aug. 19, 1983 [JP] Japan ............................. 58-151347

[51] Int. Cl.[4] ..................... G11B 7/00; H04N 5/781
[52] U.S. Cl. ................................. 358/341; 358/342
[58] Field of Search ............... 358/342, 337, 338, 341; 369/43–47

[56] References Cited

U.S. PATENT DOCUMENTS 4,398,224  8/1983  Watanabe ........................... 358/339
4,564,945  1/1986  Glover et al. ........................ 371/38

Primary Examiner—Robert L. Richardson
Attorney, Agent, or Firm—Michael N. Meller

[57] ABSTRACT

A recording and reproducing system records and reproduces signals on and from a disc, so that information signals including one of first and second system composite video signals are subjected to an analog modulation and recorded on analog recorded track turns on the disc, and digital signals made up of digital data or the like obtained by subjecting information signals to a digital modulation are recorded on digital recorded track turns on the disc. The digital signals are recorded on the digital recorded track turns on the disc with a predetermined transmission frequency, so that the digital signals are reproduced from the digital recorded track turns on the disc with an approximately constant transmission frequency when a first system disc recorded with the first system composite video signal is played on a reproducing apparatus primarily designed for playing a second system disc recorded with the second system composite video signal and when the second system disc is played on a reproducing apparatus primarily designed to play the first system disc.

6 Claims, 9 Drawing Figures

RECORDING AND REPRODUCING SYSTEM FOR RECORDING BOTH ANALOGUE AND DIGITAL INFORMATION ON AND FROM A DISC

BACKGROUND OF THE INVENTION

The present invention generally relates to recording and reproducing systems for recording and reproducing signals on and from a first system rotary recording medium so that the first system rotary recording medium is compatibly playable on a reproducing apparatus which is primarily designed to play a second system rotary recording medium. A rotary recording medium has first kind of track turns which are recorded with analog signals mainly comprising a composite video signal of a first television system which employs 625 scanning lines and a field frequency of 50 Hz or a composite video signal of a second television system which employs 525 scanning lines and a field frequency of 59.94 Hz, and a second kind of track turns which are recorded with digital signals made up of audio information and/or still picture information, and the first and second kinds of track turns coexist on the same surface of the rotary recording medium. More particularly, the present invention relates to a recording and reproducing system for recording and reproducing such signals on the rotary recording medium so that the rotary recording medium is compatibly playable on a reproducing apparatus of a television system employing a horizontal synchronizing signal frequency which is different from the horizontal synchronizing signal frequency of the recorded signals on the rotary recording medium which is being played.

There is a known type of a rotary recording medium (hereinafter simply referred to as a disc) which is recorded with analog information signals such as a composite video signal and audio signals. In such a disc, the analog information signals are subjected to a frequency modulation, for example, and are recorded on a spiral track or concentric tracks on the disc as variations in geometrical configuration, for example. This disc is often referred to as a video disc because the recorded information mainly includes the composite video signal. The composite video signal or the like is recorded on the track turns on the video disc in the form of modulated signals which are obtained by modulating a carrier by the analog information signals. An address signal which is used for random access and the like, is recorded within a predetermined duration within a vertical blanking period of the composite video signal, for example. The address signal itself is an encoded digital signal, however, the main information recorded on the video disc is the analog modulated composite video signal or the like. Hence, in the present specification, track turns such as the recorded tracks of this video disc, will be referred to as "analog recorded track turns" for convenience' sake.

On the other hand, there is another type of a disc which is recorded with digital signals. In such a disc, audio signals or audio and video signals are subjected to a digital modulation, and are time-sequentially multiplexed and recorded on concentric tracks or a spiral track on the disc as variations in geometrical configuration, for example. This disc is often referred to as a digital audio disc because the recorded information mainly includes the audio signals, and the video signal mainly relates to a still picture and is simply recorded as a supplementary information to help the listener with his imagination. The audio signals or the audio and video signals are recorded on the track turns on the digital audio disc after being converted into the form of digital signals which are obtained by subjecting the audio signals or the audio and video signals to a digital modulation and then subjecting the digital modulated signals to a frequency modulation or the like. In the present specification, track turns such as the recorded tracks of this digital audio disc, will be referred to as "digital recorded track turns" for convenience' sake.

In an electrostatic capacitance type video disc proposed in a U.S. Pat. No. 4,331,976, the recorded signals are reproduced from the video disc by detecting the variations in the electrostatic capacitance which is formed between the video disc and an electrode of a reproducing stylus. Reference signals for tracking control, are recorded on both sides of the information signal recorded track (analog recorded track). According to this video disc, the need for a stylus guide groove was eliminated by use of the reference signals, as is known. In this known video disc, a tracking control was carried out with respect to the reproducing stylus so that the reproducing stylus accurately scans over the information recorded track during the reproduction mode, by comparing the levels of the reference signals which are reproduced from the video disc.

On the other hand, an electrostatic capacitance type digital audio disc is also known. The electrostatic capacitance type digital audio disc has no stylus guide groove and is recorded with reference signals for tracking control on both sides of the information signal recorded track (digital recorded track), similarly as in the case of the electrostatic capacitance type video disc. During the reproducing mode, this electrostatic capacitance type digital audio disc is rotated at a predetermined rotational speed which is the same as the rotational speed of the electrostatic capacitance type video disc. The frequencies of the reference signals and the method of reproducing the reference signals, are the same between the electrostatic capacitance type digital audio disc and the electrostatic capacitance type video disc. Further, in both the electrostatic capacitance type digital audio disc and the electrostatic capacitance type video disc, the recorded signals are reproduced from the disc by detecting the variations in the electrostatic capacitance between the disc and the electrode of the reproducing stylus. For these reasons, even when the digital audio disc is played on a video disc reproducing apparatus which is designed to play the video disc, the tracking control is carried out with respect to the reproducing stylus similarly as in the case where the video disc is played, and the recorded signals can be picked up and reproduced from the digital audio disc by the reproducing stylus. The signals which are reproduced from the digital audio disc, are demodulated into original audio signals or the like in an adapter which is coupled to the video disc reproducing apparatus.

Accordingly, the previously proposed electrostatic capacitance type video disc and the electrostatic capacitance type digital audio disc can be played on the same electrostatic capacitance type video disc reproducing apparatus. In other words, the above video disc and the digital audio disc can be played compatibly on the same video disc reproducing apparatus.

However, the digital audio disc and the video disc were mutually independent discs, and the compatibility did not exist in the true sense of the word. On the other hand, the digital audio disc is recorded with digital signals. Thus, compared to the video disc, the audio signals are reproduced from the digital audio disc with a wide dynamic range and with an extremely high fidelity, due to the characteristics of the digital signal transmission. Moreover, the still picture which is reproduced from the digital audio disc is extremely sharp, and there is of course an advantage in that the audio signals are reproduced from the digital audio disc with an extremely high fidelity together with the still picture. On the other hand, the still picture is reproduced from the video disc by repeatedly reproducing the same track turn on the video disc. Generally, the audio signals are muted during the still picture reproduction, and it is impossible to simultaneously reproduce the audio signals and the video signal from the video disc. However, due to the analog signal transmission in the video disc, it is possible to transmit the information signals in real time with a frequency band in the range of several MHz according to the video disc. Thus, compared to the digital audio disc in which the information signals are transmitted with a frequency band in the range of several tens of kHz in order to improve the transmitting accuracy, the video disc is advantageous in that it is possible to simultaneously reproduce a moving picture and the audio signals. Accordingly, in order to ensure optimum reproduction of the recorded signals, it is desirable to select and reproduce one of the digital signals and the analog signals depending on the information contents.

Accordingly, in a U.S. patent application Ser. No. 609,237 filed May 11, 1984 in which the assignee is the same as the assignee of the present application, a novel and useful reproducing apparatus was proposed. According to this proposed reproducing apparatus, the analog recorded track turns and the digital recorded track turns coexist on the disc depending on the recorded information content, and the recorded information signals are satisfactorily reproduced from the disc regardless of whether the the track turn being scanned is the analog recorded track turn or the digital recorded track turn. Hence, the advantages of the video disc and the digital audio disc can both be exhibited to the maximum, and the video disc and the digital audio disc are compatibly playable on the reproducing apparatus.

In addition, in this proposed reproducing apparatus, the disc which is recorded with a composite video signal of one television system on the analog recorded track turns thereof, is compatibly playable on a reproducing apparatus which is primarily designed to play a disc which is recorded with a composite video signal of a different television system, and the recorded composite video signal is reproduced as the composite video signal of the different television system. Such compatible reproduction is achieved by controlling the rotational speed of the disc so that the recorded horizontal synchronizing signal is reproduced from the disc with a frequency which is equal to a horizontal synchronizing signal frequency of the television system which is set for the reproducing apparatus, as is done in a compatibly reproducing means disclosed in a U.S. Pat. No. 4,445,143 in which the assignee is the same as the assignee of the present application. The disc on which the analog recorded track turns and the digital recorded tracks coexist, is normally played by rotating the disc at a rotational speed which is identical to the rotational speed of the video disc which is recorded with a composite video signal of a television system which is the same as the television system of the composite video signal recorded on the analog recorded track turns on the disc. Further, the digital signals recorded on the digital recorded track turns on the disc, are reproduced at a predetermined transmission frequency (that is, at a predetermined block transmission quantity per second) of 44.100 kHz or 44.056 kHz.

For example, a first system disc is recorded with a composite video signal of a first television system employing 625 scanning lines and a field frequency of 50 Hz, on the analog recorded track turns thereof, at a rate of four fields per revolution of the disc. This first system disc is recorded with 3528 ($=44.100 \times 10^3 \times 4 \div 50.0$) blocks of digital signals with a transmission frequency of 44.100 kHz on the digital recorded track turns thereof. Normally, the recorded signals are reproduced from this first system disc by rotating this first system disc at a rotational speed of 750 rpm.

However, when the recorded horizontal synchronizing signal having a frequency of 15.625 kHz is to be reproduced from the first system disc, at a horizontal synchronizing signal frequency of 15.734 kHz of a second system which employs 525 scanning lines and a field frequency of 59.94 Hz, that is, when the first system disc is to be compatibly played on a reproducing apparatus which is primarily designed for a second system disc, the first system disc is rotated at a rotational speed of 755.2 rpm which is approximately 0.7% faster than the original rotational speed of 750 rpm. As a result, the recorded digital signals are also not reproduced at the original transmission frequency of 44.100 kHz, but are reproduced at a transmission frequency of 44.408 ($=44.1 \times 15.734 \div 15.625$) kHz. Similarly, when compatibly playing the second system disc on a reproducing apparatus which is primarily designed for the first system disc, the recorded digital signals are reproduced from the digital recorded track turns on the second system disc at a transmission frequency which is different from the original transmission frequency. On the other hand, the frequency of a master clock signal for a digital signal demodulating circuit which demodulates the digital signals which are reproduced from the digital recorded track turns on the disc so as to demodulate the reproduced digital signals into the original four channels of audio signals or a still picture signal, is selected to a predetermined number (for example, 140) times the transmission frequency with which the digital signals are reproduced from the digital recorded track turns on the disc.

For this reason, when compatibly playing the first (or second) system disc on the reproducing apparatus which is primarily designed to play the second (or first) system disc, it is necessary to change the frequency of the master clock signal in addition to changing the rotational speed of the disc. Therefore, there are problems in that the construction of a phase locked loop (PLL) for generating the master clock signal is complex and expensive.

SUMMARY OF THE INVENTION

Accordingly, it is a general object of the present invention to provide a novel and useful recording and reproducing system for recording and reproducing signals on and from a first system disc so that the first system disc is compatibly playable on a reproducing apparatus which is primarily designed to play a second system disc, in which the problems described heretofore are eliminated.

Another and more specific object of the present invention is to provide a recording and reproducing system for recording and reproducing signals on and from a disc, so that information signals including one of first and second system composite video signals are subjected to an analog modulation and recorded on analog recorded tracks on the disc, and digital signals made up of digital data or the like obtained by subjecting information signals to a digital modulation are recorded on digital recorded track turns on the disc. The digital signals are recorded on the digital recorded track turns on the disc with a predetermined transmission frequency, so that the digital signals are reproduced from the digital recorded track turns on the disc with an approximately constant transmission frequency when a first system disc recorded with the first system composite video signal is played on a reproducing apparatus primarily designed for playing a second system disc recorded with the second system composite video signal and when the second system disc is played on a reproducing apparatus primarily designed to play the first system disc. Conventionally, the frequency of a master clock signal for a digital signal demodulating circuit which demodulates the digital signals which are reproduced from the digital recorded track turns on the disc so as to demodulate the reproduced digital signals into the original signals, is selected to a predetermined number times the transmission frequency with which the digital signals are reproduced from the digital recorded track turns on the disc. For this reason, when compatibly playing the first (or second) system disc on the reproducing apparatus which is primarily designed to play the second (or first) system disc, it is necessary to change the frequency of the master clock signal. However, according to the recording and reproducing system of the present invention, the digital signals are reproduced from the digital recorded track turns on the first (or second) system disc with an approximately constant transmission frequency when the first (or second) system disc is compatibly played on a reproducing apparatus primarily designed for playing the second (or first) system disc. Therefore, the frequency of the master clock signal can be the same in a case where the reproducing apparatus designed for playing the first (or second) system disc is playing the first (or second) system disc and in a case where this reproducing apparatus is playing the second (or first) system disc. As a result, the master clock signal can be generated from the same circuit for each of these cases, and it is unnecessary to provide a variable frequency divider or the like as in the conventional system. Thus, the circuit construction of the reproducing apparatus can be made simple, and the manufacturing cost of the reproducing apparatus can be reduced.

Other objects and further features of the present invention will be apparent from the following detailed description when read in conjunction with the accompanying drawings.

DETAILED DESCRIPTION

Figure 1:
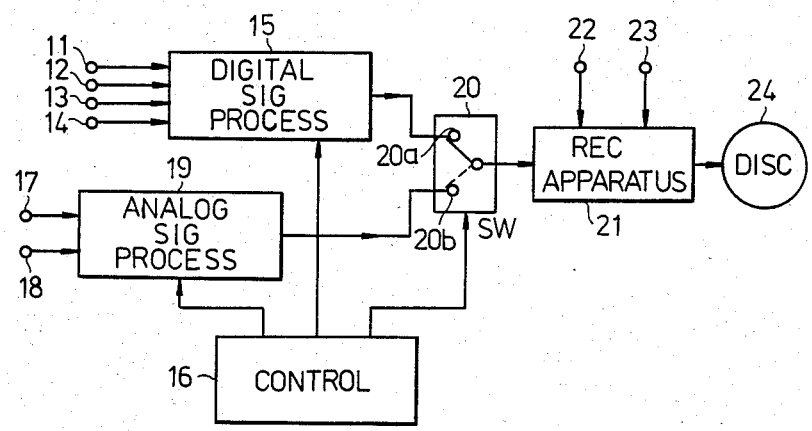
FIG. 1 is a systematic block diagram showing an embodiment of a recording system of the recording and reproducing system according to the present invention.

In FIG. 1, four channels of digital data are applied to input terminals 11, 12, 13, and 14. The four channels of digital data are made up of digital data which are obtained by subjecting audio signals to a digital modulation (pulse code modulation or PCM, for example) and/or component coded data which are obtained by subjecting a one frame (or one field) of video signal which is related to a still picture to a PCM, for example, which video signal has a field frequency of 50 Hz and 625 scanning lines. The four channels of digital data applied to the input terminals 11, 12, 13, and 14, are supplied to a digital signal processing circuit 15. The four channels of digital data have a sampling frequency of 43.75 kHz and a quantization number of 16 bits (one word).

Figure 2:
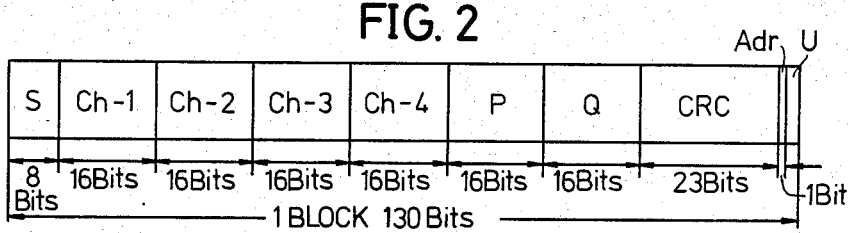
FIG. 2 shows an example of a signal format of one block of digital signals which are recorded on digital recorded track turns on a disc.

The digital signal processing circuit 15 generates one block of signal having a signal format shown in FIG. 2, under the control of a controller 16. The digital signal processing circuit 15 time-sequentially produces the generated signal in terms of blocks, at a transmission frequency of 44.056 kHz.

In the signal of one block shown in FIG. 2, S indicates the position of a synchronizing signal which has an 8-bit fixed pattern and identifies the beginning of a block. Ch-1, Ch-2, Ch-3, and Ch-4 respectively indicate the position of one word of a digital signal having 16 bits. This digital signal may be a digital audio signal which is obtained by subjecting an audio signal to a pulse code modulation, or a digital video signal which is obtained by subjecting a video signal to a pulse code modulation. For example, the signals described under one of the following cases (a) through (d) may be arranged in the positions Ch-1 through Ch-4.

(a) A case where one word of each of four channels of digital audio signals, is arranged in the positions Ch-1 through Ch-4.

(b) A case where one word of each of three channels of digital audio signals is arranged in the positions Ch-1 through Ch-3, and two picture element data of a digital video signal having a quantization number of 8 bits, for example, are arranged in the position Ch-4.

(c) A case where data of each of the channels in a first 2-channel stereo digital audio signal are arranged in the positions Ch-1 and Ch-2, and data of each of the channels in a second 2-channel stereo digital audio signal are arranged in the positions Ch-3 and Ch-4.

(d) A case where data of each of the channels in a 2-channel digital audio signal are arranged in the positions Ch-1 and Ch-2, and picture element data of the same kind or different kinds of digital video signal having a quantization number of 8 bits are arranged in the positions Ch-3 and Ch-4.

In addition, P and Q in FIG.2 indicate positions of 16-bit error correcting codes. Further, CRC indicates a position of a 23-bit error detecting code. The error detecting code is a 23-bit remainder which is obtained when each of the words arranged in the positions Ch-1 through Ch-4, P, and Q of the same block are divided by a generating polynomial of $X^{23}+X^5+X^4+X+1$, for example. When the signals in the 9-th through 127-th bits of the same block are divided by the above generating polynomial during the reproduction and the remainder is zero, it is detected that there is no error in that block. Moreover, in FIG. 2, Adr indicates a multiplexing position of 1 bit of one of various kinds of address signals which are used during a random access and the like. The bits of the address signal are distributed, and 1 bit of the address signal is transmitted in one block. For example, all of the bits of the address signal are transmitted in 196 blocks (in this case, the address signal has 196 bits).

In FIG. 2, U indicates a position of a 2-bit signal which is often called user's bits. One block of the digital signal is therefore made up of 130 bits from the position S to the position U. The digital signal is time-sequentially multiplexed and transmitted in terms of blocks, at a transmission frequency of 43.75 kHz which is equal to the sampling frequency of the digital audio signal.

The transmission frequency is selected to 43.75 kHz for the following reasons. In the case of an NTSC system (second system) disc which is recorded with the NTSC system color video signal having a field frequency of 59.94 Hz and 525 scanning lines on analog recorded track turn thereof at a rate of four fields per revolution of the disc, the digital signals are recorded on digital recorded track turns on the disc with a transmission frequency which is extremely close to 44.100 kHz at a rate of a natural number of blocks per revolution of the disc so as to facilitate the use of the disc as a data file. As previously proposed in the U.S. patent application Ser. No. 609,237, the digital signals are recorded on the digital recorded track turns on the NTSC system disc with a transmission frequency of 44.056 kHz at a rate of 2940 blocks per revolution of the disc. The frequency of a master clock signal for a demodulating circuit which demodulates the digital signals which are reproduced from the digital recorded track turns on the disc into the original information signals, is selected to a predetermined number multiple of the transmission frequency of the reproduced digital signals.

An NTSC system reproducing apparatus is primarily designed to play the above NTSC system disc which is recorded with the NTSC color video signal and with the digital signals having the transmission frequency of 44.056 kHz. The NTSC system reproducing apparatus supplies the signals reproduced from the NTSC system disc to an NTSC system monitoring reproducing apparatus which displays the NTSC system color video signal. A disc 24 which will be described later on in the specification, on which the digital signals are recorded with a transmission frequency of 43.75 kHz, may be compatibly played on the NTSC system reproducing apparatus. The disc 24 is recorded with a horizontal synchronizing signal having a frequency of 15.625 kHz, and is rotated at a rotational speed of 750 rpm when played on a reproducing apparatus which is primarily designed to play the disc 24. In the case where the disc 24 is compatibly played on the NTSC system reproducing apparatus, the rotational speed of the disc 24 is changed to 755.24 rpm from the original rotational speed of 750 rpm, so that the recorded horizontal synchronizing signal is reproduced at a frequency of 15.734 kHz which is 144/143 times the original frequency of 15.625 kHz. When the digital signals are reproduced from the disc 24 on the NTSC system reproducing apparatus with a transmission frequency of 44.056 kHz which is the same as the transmission frequency with which the digital signals are reproduced from the NTSC system disc on the NTSC system reproducing apparatus, a common master clock signal generating circuit can be used when playing the NTSC system disc and the disc 24.

In order to reproduce the digital signals from the disc 24 on the NTSC system reproducing apparatus at the transmission frequency of 44.056 kHz which is the same as the transmission frequency with which the digital signals are reproduced from the NTSC system disc on the NTSC system reproducing apparatus, the transmission frequency of the digital signals recorded on the disc 24 are selected to 43.75 kHz which is 143/144 times the transmission frequency of 44.056 kHz of the digital signals which are recorded on the NTSC system disc. In this case, exactly 3500 ($=43.75 \times 10^3 \times 4 \div 50$) blocks of signals are recorded on the digital recorded tracks on the disc 24.

Figure 3:
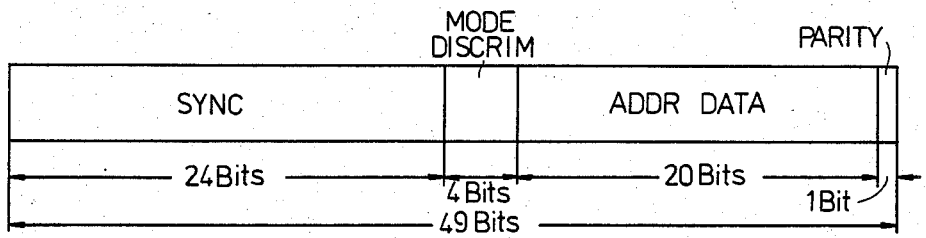
FIG. 3 shows an example of a signal format of each of address codes which are recorded on the digital recorded track turns on the disc.

For example, the 196-bit address signal is time-sequentially made up from four kinds of address codes each having 49 bits. The four kinds of address codes comprise a time address code and first through third chapter address codes, for example, and the constitution of each address code is the same. The address codes each have a signal format shown in FIG. 3. In FIG. 3, a 24-bit synchronizing signal is arranged in the first 24 bits of the address code as indicated by SYNC. The value of the 24-bit synchronizing signal differs depending on the four kinds of address codes. 4 bits which are subsequent to the 24-bit synchronizing signal, includes a source mode signal, a normal/stop mode discriminating signal, and the like. The source mode signal indicates the source mode, that is, the combination of the recorded signals from among the cases (a) through (d) described before. The normal/stop mode discriminating signal indicates whether the video disc player should assume a stop reproduction mode in which the same track turn is repeatedly reproduced. The address data is located in the 20 bits which are subsequent to these 4 bits, and the last 1 bit of the address code is a parity bit.

In the case of the time address code, the address data is a time data which indicates the reproducing time which would take in the normal reproduction mode to reach the track position where that time address code is recorded, from the starting position where the recording of the programs was started at the time of the recording. On the other hand, in the case of the chapter address code, the address data indicates the location of the music program which is recorded at the position where that chapter address code is recorded, with respect to the starting position where the recording of the programs was started at the time of the recording. Thus, the chapter address code indicates that the music program is the third program from the starting position on a disc, for example.

In the disc 24 which will be described later on in the specification, a composite video signal having a field frequency of 50 Hz and 625 scanning lines, is recorded on analog recorded tracks at a rate of four fields per revolution of the disc 24. As described before, 3500 blocks of data are recorded on digital recorded track turns on the disc 24 per revolution of the disc 24. Hence, the 196-bit address signal described before, is recorded 17.85 ($=3500 \div 196$) times per revolution of the disc 24.

When transmitting the digital video signal related to the still picture, the picture element data of the luminance signal, having a sampling frequency of 9 MHz and a quantization number of 8 bits per picture element, are converted into picture element data having a sampling frequency of 87.5 kHz by use of a memory. On the other hand, the picture element data of the two kinds of color difference signals (R-Y) and (B-Y), having a sampling frequency of 2.25 MHz and a quantization number of 8 bits per picture element data, are converted into picture element data having a sampling frequency of 87.5 kHz by use of a memory. Thus, one frame of the digital video signal is transmitted with a signal format shown in FIG. 4.

Figure 4:
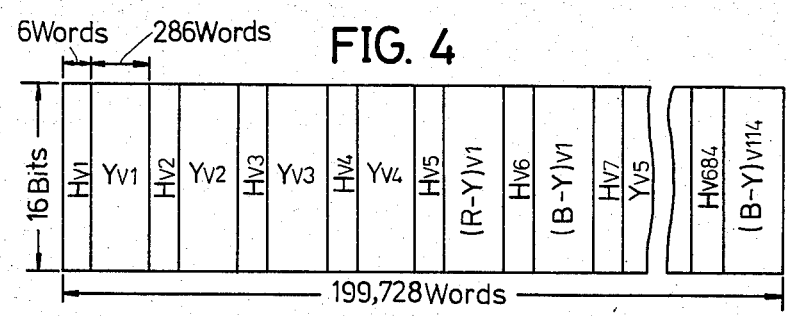
FIG. 4 shows an example of a signal format of a digital video signal which is recorded on the digital recorded track turns on the disc.

In FIG. 4, one word is made up of 16 bits, and each of the picture element data having the quantization number of 8 bits are arranged in the upper 8 bits and the lower 8 bits of one word. Hence, two picture element data can be transmitted in one word.

Figure 5:
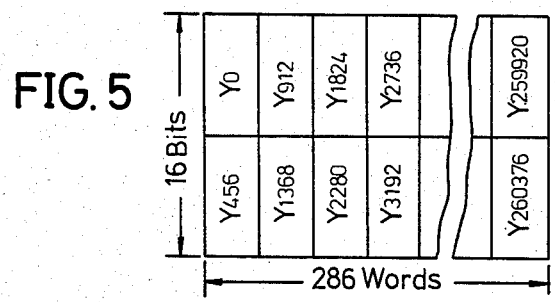
FIG. 5 shows a part of the signal format shown in FIG. 4 in more detail.

A total of 572 luminance picture element data groups in the first vertical column at the leftmost part of the screen are indicated b $Y_{V1}$, and each of the picture element data are arranged in sequence from the top of the screen to the bottom of the screen. As shown in FIG. 5, a picture element data $Y_0$ at the uppermost part of the screen is arranged in the upper 8 bits of the first word, and a picture element data $Y_{456}$ at the second uppermost part of the screen is arranged in the lower 8 bits of the first word. Similarly, a picture element data $Y_{912}$ is arranged in the upper 8 bits of the second word, a picture element data $Y_{1368}$ is arranged in the lower 8 bits of the second word, a picture element data $Y_{1824}$ is arranged in the upper 8 bits of the third word, . . . , and a picture element data $Y_{260376}$ at the lowermost part of the screen is arranged in the lower 8 bits of the 286-th word. A total of 572 luminance picture element data groups in the second column from the left end of the screen are indicated b $Y_{V2}$ in FIG. 4, and a total of 572 luminance picture element data groups in the third column from the left end of the screen are indicated by $Y_{V3}$. Similarly, a total of 572 luminance picture element data groups in the i-th (i is an integer from 1 to 456) column from the left end of the screen are indicated by $Y_{Vi}$. Each of the picture element data are arranged similarly as the above picture element data group $Y_{V1}$, and the picture element data corresponding to one vertical column are transmitted by 286 words.

In addition, a total of 572 picture element data groups of the first digital color difference signal arranged in the j-th (j is an integer from 1 to 114) column from the left end of the screen are indicated by (R-Y)$_{Vj}$, and a total of 572 picture element data groups of the second digital color difference signal arranged in the j-th column from the left end of the screen are indicated by (B-Y)$_{Vj}$. Each of the 572 picture element data groups corresponding to one column are arranged in a sequence starting from the top to the bottom of the screen in the upper 8 bits of the first word, lower 8 bits of the first word, upper 8 bits of the second word, lower 8 bits of the second word, upper 8 bits of the third word, . . . , and lower 8 bits of the 286-th word, and the picture element data corresponding to one column are transmitted by 286 words. A header signal having 6 bits, for example, is added to the beginning of each of the above divided picture element data groups.

Further, as shown in FIG. 4, the above component coded signal has a signal format in which the signal is time-sequentially transmitted in terms of units, where one unit comprises a total of six picture element data groups, that is, four picture element data groups $Y_{V(4j-3)}$, $Y_{V(4j-1)}$, and $Y_{V(4j)}$ and the two kinds of digital color difference signals (R-Y)$_{Vj}$ and (B-Y)$_{Vj}$.

As shown in FIG. 4, the header signals $H_1$ through $H_{684}$ are respectively arranged at the beginnings of each of the 684 picture element data groups $Y_i$, (R-Y)$_j$, and (B-Y)$_j$. The header signals are transmitted as discriminating signals, so that the reproducing apparatus can discriminate each of the various kinds of information contained in the picture element data group which follows immediately after the header signal. The header signals $H_1$ through $H_{684}$ each comprise 6 words and have a common signal format.

Figure 6:
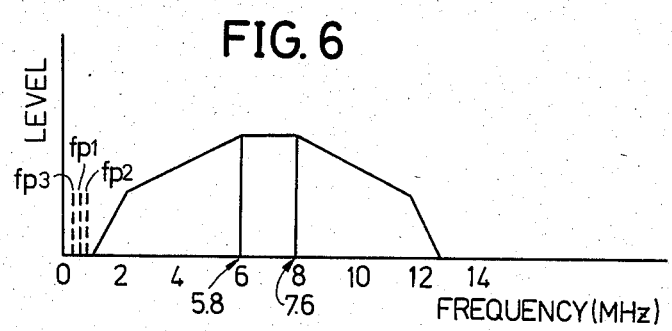
FIG. 6 shows an example of frequency spectrums of frequency modulated signals and reference signals which are recorded on the digital recorded track turns on the disc.

Returning now to the description of FIG. 1, the digital signal processing circuit 15 generates the digital signals in which signals are time-sequentially multiplexed in terms of blocks having the signal format shown in FIG. 2 with the transmission frequency of 43.75 kHz, and the produced digital signals frequency-modulate a carrier having a frequency in the range of 7 MHz, for example, so as to produce a frequency modulated signal. The digital signal processing circuit 16 applies the frequency modulated signal (first FM signal) to a terminal 20a of a switching circuit 20. An example of a frequency spectrum of this first FM signal is indicated by a solid line in FIG. 6. The carrier frequency is equal to 7.6 MHz when the data is "1", and the carrier frequency is equal to 5.8 MHz when the data is "0". In FIG. 6, frequency spectrums represented by phantom lines fp1, fp2, and fp3, indicate the respective frequency spectrums of reference signals fp1, fp2, and fp3 which are recorded together with the first FM signal.

On the other hand, a PAL system color video signal having a field frequency of 50 Hz and 625 scanning lines, for example, is applied to an input terminal 17 shown in FIG. 1. An audio signal (normally of two channels) is applied to an input terminal 18. The video and audio signals applied to the input terminals 17 and 18, are supplied to an analog signal processing circuit 19. The analog signal processing circuit 19 generates a frequency modulated signal having the same signal format as the frequency modulated signal recorded on the previously proposed video disc described before. The frequency modulated signal is obtained by carrying out a frequency modulation using a luminance signal in which various kinds of address signals are multiplexed in a specific period within the vertical blanking period. The concrete construction of the analog signal processing circuit 19 is disclosed in a U.S. Pat. No. 4,208,671 in which the assignee is the same as the assignee of the present application, and is known. Thus, detailed description of the analog signal processing circuit 19 will be omitted.

Figure 7:
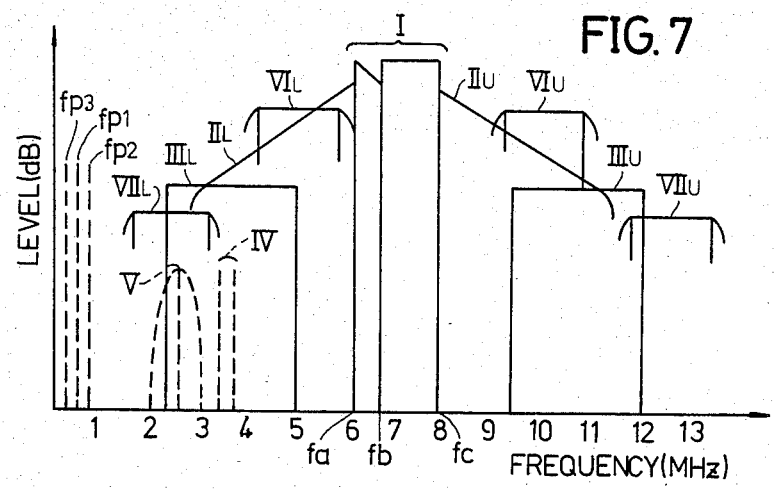
FIG. 7 shows an example of frequency spectrums of frequency modulated signals and reference signals which are recorded on analog recorded track turn on the disc.

FIG. 7 shows a frequency spectrum of the output signal of the analog signal processing circuit 19. In FIG. 7, I represents a carrier deviation band of 2.3 MHz of the frequency modulated luminance signal, $f_a$ represents a frequency of 6.1 MHz corresponding to the tip end of the synchronizing signal (synchronizing tip), $f_b$ represents a frequency of 6.6 MHz corresponding to the pedestal level, and $f_c$ represents a frequency of 7.9 MHz corresponding to the white peak. Further, $II_U$ and $II_L$ respectively represent upper and lower sidebands of the frequency modulated luminance signal, and $III_U$ and $III_L$ respectively represent upper and lower sidebands of the signal which is obtained by further frequency-modulating frequency modulated audio signals $f_{A1}$ and $f_{A2}$. Moreover, IV represents carriers of 3.43 MHz and 3.73 MHz of the 2-channel frequency modulated audio signals $f_{A1}$ and $f_{A2}$.

In addition, V represents a frequency band of the low-band-converted carrier chrominance signal which is obtained by frequency-converting the carrier chrominance signal which is separated from the color video signal applied to the input terminal 17. First sidebands which are obtained when the low-band-converted carrier chrominance signal is frequency-modulated, are represented by $VI_U$ and $VI_L$, and second sidebands which are obtained when the low-band-converted carrier chrominance signal is frequency-modulated, are represented by $VII_U$ and $VII_L$. In FIG. 7, the frequency spectrums of the signals which are obtained from the analog signal processing circuit 19, are indicated by solid lines.

The reference signals fp1, fp2, and fp3 described later on in the specification, are located in the unoccupied frequency band below the band $VII_L$ shown in FIG. 7. The occupying frequency bands of the reference signals fp1 through fp3 and the information signals are separated, because the reference signals fp1 through fp3 and the information signals need to be picked up from the disc by the same reproducing stylus.

The first FM signal having the frequency spectrum indicated by the solid line in FIG. 6 is applied to the terminal 20a of the switching circuit 20, and a second FM signal having the frequency spectrum indicated by the solid line in FIG. 7 is applied to a terminal 20b of the switching circuit 20. The switching circuit 20 selectively produces and supplies only one of the first and second FM signals to a recording apparatus 21 under control of an output signal of the controller 16. The recording apparatus 21 is a known cutting apparatus which employs a laser beam. The recording apparatus 21 is supplied with the output signal of the switching circuit 20, and with signals obtained through input terminals 22 and 23. The signal from the input terminal 22 comprises a reference signal in which the first and second reference signals fp1 and fp2 are alternately switched and arranged in a burst manner for every duration of four fields which is equal to a duration of one revolution of the disc. The signal from the input terminal 23 is the third reference signal fp3 which is generated in relation to the position where the first and second reference signals fp1 and fp2 switch. The recording apparatus 21 converts the signals supplied thereto, into first and second modulated laser beams, and simultaneously impinges the first and second modulated laser beams on a photosensitive agent which covers the surface of an original recording disc, with the first and second modulated laser beams mutually separated by approximately ½ track pitch. Then, the original recording disc is subjected to a known developing process, and to a known disc manufacturing process. As a result, the disc 24 which is produced, has an electrode function, does not have guide grooves for guiding the reproducing stylus, and has a track pattern shown in FIG. 8.

Figure 8:
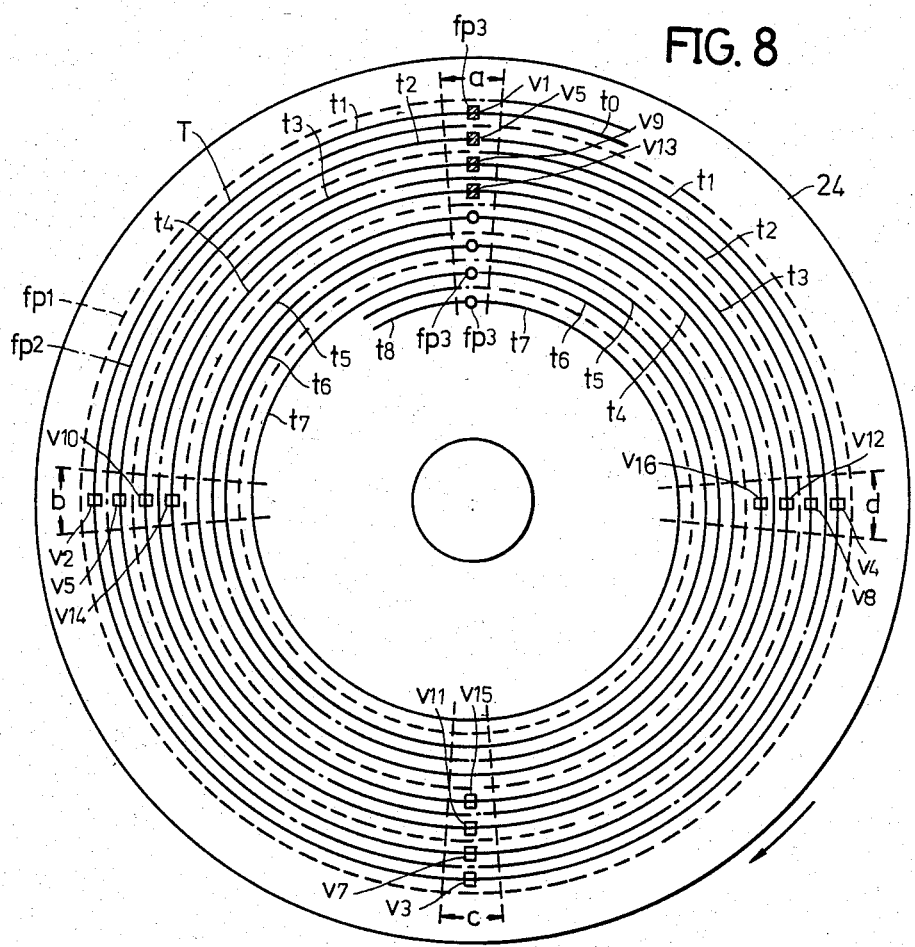
FIG. 8 shows an example of a track pattern on the disc.

The first FM signal or the second FM signal from the switching circuit 20, is recorded on a spiral track T on the disc 24 shown in FIG. 8, as rows of intermittent pits. In the single and continuous spiral track T which is indicated by a solid line in FIG. 8, each track turn of the disc 24 is represented by t1, t2, t3, . . . . Each track turn is formed with pits of the information signal on a flat surface thereof, and no guide groove is formed for guiding the reproducing stylus. With respect to one track turn, pits of the first reference signal fp1 and pits of the second reference signal fp2 are respectively formed on both sides thereof along the longitudinal direction of the track turn for every horizontal scanning period (1H), at positions corresponding to the horizontal blanking period.

Pits of only one of the reference signals fp1 and fp2 are formed at an intermediate position between center lines of adjacent track turns. Moreover, with respect to one track turn, the sides on which the reference signals fp1 and fp2 are recorded, are alternated for each track turn. In other words, the track of the first reference signal fp1 is represented by a broken line, and the track of the second reference signal fp2 is represented a by one-dot chain line in FIG. 8. Positions where the vertical synchronizing signal is recorded in each field, are represented by $V_1$, $V_2$, $V_3$, . . . . Furthermore, the third reference signal fp3 is recorded for a duration of approximately 3H, for example, at the starting positions of the tracks t1, t2, t3, . . . , that is, the positions $V_1$, $V_5$, $V_9$, . . . where the sides on which the reference signals fp1 and fp2 are recorded are interchanged.

The period in which the disc 24 undergoes one revolution, is equal to a period of four fields of the video signal, for example. The vertical blanking periods are recorded within recording part a, b, c, and d of the analog recorded tracks t1, t2, t3, and t4 as shown in FIG. 7. The address signals $A_C$, $A_T$, and $A_N$ are time-sequentially recorded in the recording parts a through d in each of the analog recorded track turns t1 through t4 on the disc 24.

The digital recorded track turns t5, t6, t7, . . . are also formed on the spiral track T. However, the signal of one block having the signal format shown in FIG. 2, is time-sequentially multiplexed with the transmission frequency of 43.75 kHz and is recorded on the digital recorded track turns t5 through t7 as the first FM signal. Thus, the recording parts a through d which correspond to the vertical blanking periods, do not exist in the digital recorded track turns t5 through t7. On the other hand, the reference signal fp3 is recorded on the digital recorded track turns t5 through t7, radially aligned with the reference signal fp3 which is recorded on the analog recorded track turns t1 through t4. Moreover, the reference signals fp1 and,fp2 are, recorded on both sides of the digital recorded track turns t5 through t7 with a period of 1H. In other words, the reference signals fp1 through fp3 are constantly recorded on the disc with constant periods, regardless of whether the recorded track turn is an analog recorded track turn or a digital recorded track turn.

The track pattern itself is the same as the track pattern on the video disc and the digital audio disc which have been previously proposed under the same assignee. In addition, the signal format (FIGS.2 and 3) of the digital signal recorded on the digital recorded track turns, the signal format of the digital video signal (especially related to the still picture, but may be related to a partially moving picture) shown in FIGS. 4 and 5, and the frequency spectrum of the FM signal shown in FIG. 6 which is to be recorded on the digital recorded track turns, are the same as those of the above digital audio disc. Furthermore, the frequency spectrum of the FM signal shown in FIG. 7 which is recorded on the analog recorded track turns, are also the same as that of the above video disc.

The disc which is recorded by the system according to the present invention, is characterized in that the digital recorded track turn which are recorded with the first FM signal from the digital signal processing circuit 15, and the analog recorded track turn which are recorded with the second FM signal from the analog signal processing circuit 19, coexist on the same side of the disc depending on the recording information contents, and that the transmission frequency of the digital signals is selected in a predetermined manner. In other words, audio information such as an audio signal related to a music which needs to be reproduced with a high fidelity, and video information such as a video signal related to a still picture such as a page of encyclopedia or the like, are recorded on the digital recorded track turn with the transmission frequency of 43.75 kHz. On the other hand, video information such as a video signal related to a moving picture, is recorded on the analog recorded track turn.

The rotational speed of the digital audio disc previously proposed under the same assignee, is 900 rpm. In addition, the number of blocks in one revolution of this digital audio disc is 2940, and the transmission frequency of one block is 44.1 kHz. On the other hand, in the disc 24, the transmission frequency of one block is equal to 43.75 kHz, and 3500 blocks are recorded on the digital recorded track turn in one revolution of the disc 24.

Accordingly, it is possible to play the disc 24 on the existing disc reproducing apparatus, compatibly with the existing digital audio disc and the existing video disc which were previously proposed under the same assignee, by only making a simple modification of the existing disc reproducing apparatus.

In the disc 24, four consecutive first track turns which are an extension of the digital recorded track turns and four consecutive second track turns which are an extension of the analog recorded track turns are connected to each other to form a total of eight track turns, between one digital recorded track turn and one analog track turn. The one digital recorded track turn is an end or beginning track turn out of the digital recorded track turns, and the one analog recorded track turn is a beginning or end track turn out of the analog recorded track turns, which are located close to each other. Each of the four consecutive first track turns is recorded with the first FM signal having a signal which is silent and contains no data as the modulating signal. Each of the four consecutive second track turns is recorded with the second FM signal having a composite video signal (so-called black burst signal) which contains all black picture information in the video durations of the composite video signal as the modulating signal. With this track configuration, when the reproducing stylus moves from one region of the digital recorded track turns to another region of the analog recorded track turns of vice versa, such entry into a different region can be detected by picking up the second or the first FM signal reproduced from the belonging four consecutive second or first track turns, as the four consecutive second track turns are located adjacent to the one analog recorded track turn and the four consecutive first track turns are located adjacent to the one digital recorded track turn.

Four first track turns and four second track turns exist between the one digital recorded track turn and the one analog recorded track turn. Thus, even when a dropout occurs in the reproduced signal, it is possible to positively detect the position where the recorded turn track changes between the digital recorded turn track and the analog recorded track turn. In addition, even when there is a time delay in a circuit which carries out a switching and operates one of a digital signal demodulating circuit and an analog signal demodulating circuit so as to demodulate the signals which are reproduced from the disc, it is possible to demodulate the signals reproduced from the analog recorded track turns or the digital recorded track turns only after one of the demodulating circuits has been operated, since the switching can be completed while the reproducing stylus reproduces the first and second track turns.

Figure 9:
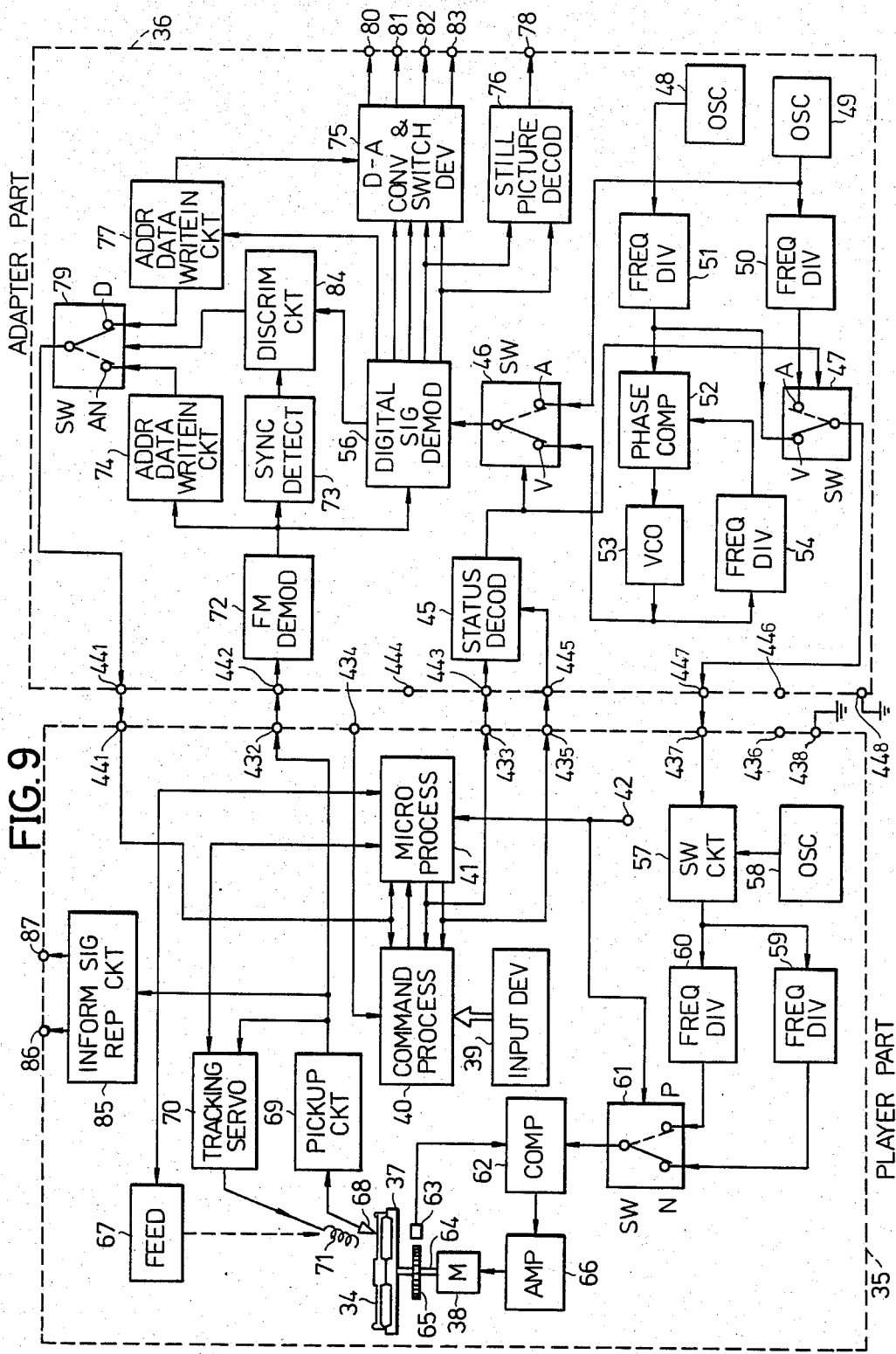
FIG. 9 is a systematic block diagram showing an embodiment of a reproducing apparatus which is a reproducing system of the recording and reproducing system according to the present invention.

Next, description will be given with respect to a disc reproducing apparatus which is a reproducing system in the system according to the present invention. FIG. 9 is a systematic block diagram showing an embodiment of the disc reproducing apparatus. As described before, the disc reproducing apparatus is designed to compatibly play first through fifth discs, where the analog recorded track turns and the digital recorded tracks coexist on the first and second discs. The composite video signal of the NTSC system, for example, having 525 scanning lines is pre-recorded on the analog recorded track turns on the first disc, and the composite video signal of the PAL or SECAM system, for example, having 625 scanning lines is pre-recorded on the analog recorded track turns on the second disc. The third and fourth discs are the existing video discs which only comprise the analog recorded track turns. The composite video signal having 525 scanning lines is pre-recorded on the third disc, and the composite video signal having 625 scanning lines is pre-recorded on the fourth disc. The fifth disc is the digital audio disc described before which has been previously proposed. The disc reproducing apparatus according to the present invention supplies the reproduced composite video signal to either one of a monitoring reproducing apparatus of the system employing 525 scanning lines or a monitoring reproducing apparatus of the system employing 625 scanning lines. For convenience' sake, it will be assumed that the monitoring reproducing apparatus is originally designed to display the NTSC system color video signal having 525 scanning lines, and description will hereinafter be given with respect to a disc reproducing apparatus which supplies the reproduced composite video signal to such a monitoring reproducing apparatus. A recording and reproducing system which enables a monitoring reproducing apparatus to satisfactorily reproduce and display signals from a video disc which has been pre-recorded with a video signal having a number of scanning lines different from that of a television signal that the monitoring reproducing apparatus is originally designed to reproduce and display, has already been disclosed in a U.S. Pat. No. 4,445,143 in which the assignee is the same as the assignee of the present application.

The rotation control based on the above recording and reproducing system, is carried out as will be described hereinafter by a servo circuit for a motor 38 which rotates a turntable 37 within a player part 35 in FIG. 9. In FIG. 9, a disc reproducing apparatus comprises the player part 35 and an adapter part 36. When a load switch of an input device 39 is manipulated, an output signal of this load switch is supplied to a command processor 40, and is then supplied to a microprocessor 41. Signals from the input device 39, command signals from an external device such as a personal microcomputer having a discriminating function, and the like, are supplied to the command processor 40. The command processor 40 carries out operations such as driving a display device (not shown) according to a display mode, and transferring the signals from the input device 39 to the microprocessor 41.

As will be described later on in the specification, the microprocessor 41 generates and supplies signals such as a clock signal and a status signal to the command processor 40. On the other hand, the microprocessor 41 controls the operations of various mechanisms and circuits within the player part 35, and puts the player part 35 in a state where a disc 34 can be inserted into the player part 35 from the outside in response to the output signal of the load switch. As described in the U.S. Pat. No. 4,352,174 in which the assignee is the same as the assignee of the present application, the disc 34 is accommodated within a disc accommodating case (not shown) when the disc 34 is outside the player part 35. When the disc accommodating case accommodating therein the disc 34 is inserted into the player part 35 in the above state and is then extracted from the player part 35, predetermined mechanisms operate to keep the disc 34 and a lid plate of the disc accommodating case inside the player part 35. Description of the predetermined mechanisms will be omitted in the present specification. As a result, only an empty jacket of the disc accommodating case is extracted from the player part 35. The disc 34 is placed onto the turntable 37 inside the player part 35.

On the other hand, at the same time, a plurality of microswitches (not shown) located at the innermost part of the player part 35 are turned ON and OFF depending on the combination of the existence and non-existence of cutouts located on the front end of the lid plate. As disclosed in a U.S. Pat. No. 4,419,710 in which the assignee is the same as the assignee of the present application, it is possible to detect various recorded contents on the disc, the side of the disc to be reproduced, and the like, from the ON and OFF states of the microswitches. The output signals of the microswitches, such as a disc discriminating signal which indicates whether the disc 34 is a digital audio disc or a video disc (it will be assumed that the disc recorded by the system according to the present invention is discriminated as being a video disc), are supplied to the microprocessor 41 through an input terminal 42. Hence, the microprocessor 41 serially supplies a 25-bit status signal, for example, to a pin terminal $43_3$ of a DIN-type 8-pin connector.

The 8-pin connector comprises pin terminals $43_1$ through $43_8$. The address data from the adapter part 36 is applied to the pin terminal $43_1$, and a reproduced signal (RF signal) is produced through the pin terminal $43_2$ as will be described hereinafter. A command signal of an external device such as a personal microcomputer having a discriminating function, is applied to the pin terminal $43_4$ according to the needs. The clock signal from the microprocessor 41 is produced through the pin terminal $43_5$. An external synchronizing signal from the adapter part 36, is applied to the pin terminal $43_7$. Further, the pin terminal $43_8$ is grounded, and the pin terminal $43_6$ is not used. When coupling the player part 35 to a personal microcomputer or the like, unlike in the case where the player part 35 is coupled to the adapter part 36, the address data is produced from the pin terminal $43_1$, the reproduced audio signal is produced through the pin terminal $43_6$, and the pin terminal $43_7$ is not used.

The status signal from the microprocessor 41 shown in FIG. 9, is produced in synchronism with the clock signal. This status signal is supplied to a status decoding circuit 45 wherein the value of the second bit of the status signal is detected, through a pin terminal $44_3$ of a DIN-type 8-pin connector comprising pin terminals $44_1$ through $44_8$ as shown in FIG. 11. The second bit of the status signal indicates whether the disc 34 is a digital audio disc or a video disc (the disc 24 will be detected as a video disc). The clock signal is supplied to the status decoding circuit 45 and the like, through the pin terminals $43_5$ and $44_5$. An output signal of the status decoding circuit 45 is applied to switching circuits 46 and 47 as a switching signal. When the digital audio disc is being played, the switching circuits 46 and 47 are connected to respective terminals A in response to this switching signal. On the other hand, when the video disc or the disc 24 on which the analog recorded track turns and the digital recorded track turns coexist is being played, the switching circuits 46 and 47 are connected to respective terminals V in response to the switching signal from the status decoding circuit 45.

The adapter part 36 comprises oscillators 48 and 49. The oscillator 48 produces a signal having an oscillation frequency which is four times the chrominance subcarrier frequency (3.579545 MHz in this case) of the color video signal which is to be originally reproduced in a second system monitoring reproducing apparatus (not shown) which receives the reproduced composite video signal from the disc reproducing apparatus. On the other hand, the oscillator 49 produces a signal having an oscillation frequency of 6.174 MHz which is 140 times the transmission frequency of the digital signals recorded on the digital audio disc. The output signal of the oscillator 49 is supplied to the terminal A of the switching circuit 46. In addition, the output signal of the oscillator 49 is frequency-divided by 1/392 in a frequency divider 50. An output signal of the frequency divider 50 having a frequency of 15.75 kHz, is supplied to the terminal A of the switching circuit 47.

The output signal of the oscillator 48 is frequency-divided by 1/910 in a frequency divider 51. An output signal of the frequency divider 51 having the horizontal scanning frequency of 15.734 kHz, is supplied to the terminal V of the switching circuit 47 and to a phase comparator 52. The oscillator 48 and the frequency divider 51 constitute a first oscillator circuit, and the oscillator 49 and the frequency divider 50 constitute a second oscillator circuit.

The phase comparator 52 constitutes a known phase locked loop (PLL) together with a voltage controlled oscillator (VCO) 53 and a frequency divider 54. An output signal of the VCO 53 is supplied to the phase comparator 52 through the frequency divider 54, and to the terminal V of the switching circuit 46. When playing the disc 24, the switching circuits 46 and 47 are respectively controlled to selectively pass the signals supplied to the respective terminals V, as described before. Thus, in this case, the output signal of the VCO 53 is obtained from the switching circuit 46, and is supplied to a digital signal demodulating circuit 56 as a master clock signal. At the same time, the output signal of the frequency divider 51 having the horizontal scanning frequency of 15.734 kHz, is obtained from the switching circuit 47. The signal obtained from the switching circuit 47 is passed through the pin terminals 44₇ and 43₇, and is supplied to a switching circuit 57 within the player part 35 as a motor rotation synchronizing signal.

As described before, the NTSC system reproducing apparatus is primarily designed to play the NTSC system (second system) disc which is recorded with the NTSC color video signal on the analog recorded track turns thereof and with the digital signals having the transmission frequency of 44.056 kHz on the digital recorded track turns thereof. Since the NTSC system reproducing apparatus reproduces the digital signals from the NTSC system disc with the transmission frequency of 44.056 kHz which is the same as the transmission frequency with which the digital signals are recorded at the time of the recording, the frequency dividing ratio of the frequency divider 54 is selected to 1/392. Hence, a signal having a frequency of 6.1678 MHz (=44.056 kHz×140) is obtained from the VCO 53, and is supplied to the digital signal demodulating circuit 56 as the master clock signal, through the switching circuit 46. On the other hand, the composite video signal of the PAL system or the SECAM system employing 625 scanning lines is converted into a predetermined signal format and recorded on the analog recorded tracks on the disc 24, at a rate of four fields per revolution of the disc 24. 3500 blocks of the digital signals are recorded on the digital recorded track turns on the disc 24 per revolution of the disc 24, with the transmission frequency of 43.75 kHz.

According to the present embodiment, the disc 24 is played on the NTSC system reproducing apparatus so that the reproduced signals from the disc 24 can be reproduced and displayed satisfactorily on the NTSC system monitoring reproducing apparatus. The rotational speed of the motor 38 is controlled so that the horizontal scanning frequency which is recorded with the frequency of 15.625 kHz at the time of the recording, is reproduced with the NTSC system horizontal frequency of 15.734 kHz which is 144/143 times the frequency of 15.625 kHz. Thus, the disc 24 is not rotated at the rotational speed of 750 rpm, but is rotated at a rotational speed of 755.24 (=750×(144/143)) rpm. As a result, the transmission frequency of the digital signals which are reproduced from the disc 24, is not 43.75 kHz but is equal to 44.056 (=43.75×(144/143)) kHz. Therefore, even when the NTSC system reproducing apparatus compatibly plays the disc 24, the frequency of the master clock signal which is required in the digital signal demodulating circuit 56 is equal to 6.1678 MHz which is the same as the master clock signal frequency used when playing the NTSC system disc. For this reason, the frequency dividing ratio of the frequency divider 54 need not be made variable, and the same PLL can be used to obtain the master clock signal. The switching circuit 57 is designed to selectively produce the signal having the horizontal scanning frequency $f_H$ when this signal is applied to the pin terminal 43₇, and to selectively produce the signal which is produced from an oscillator 58 and has the horizontal scanning frequency $f_H$ when no signal is applied to the pin terminal 43₇.

The signal which is applied to the pin terminal 43₇ and is produced from the switching circuit 57, is frequency-divided by 1/21 in a frequency divider 59. A frequency divided output of the frequency divider 59 is supplied to a terminal N of a switching circuit 61, and to a frequency divider 60 wherein the signal is frequency-divided by 1/25. A frequency divided output of the frequency divider 60 is supplied to a terminal P of the switching circuit 61. The switching of the switching circuit 61 is controlled responsive to the signal applied to the input terminal 42. The switching circuit 61 is connected to the terminal P when the disc 24 is to be played, and is connected to the terminal N when NTSC system (second system) disc or the video disc is to be played. An output signal of the switching circuit 61 is supplied to a comparator 62, as a reference signal for the servo circuit which controls the motor 38. The comparator 62 compares the phase of an output pulse signal of a magnetic detector 63 with the phase of the reference signal which is obtained from the switching circuit 61.

A gear wheel 65 is fixed on a rotary shaft 64 of the motor 38. For example, fifty teeth are formed on the outer peripheral surface of the gear wheel 65 with the same angular separation. The magnetic detector 63 is disposed at a position so as to oppose the teeth of the gear wheel 65 over a small distance. Accordingly, when the motor 38 rotates, the turntable 37, the disc 34 which is placed on the turntable 37, and the gear wheel 65 rotate unitarily with the motor 38. Every time one of the teeth of the gear wheel 65 passes in front of the magnetic detector 63, one pulse is produced from the magnetic detector 63 and is supplied to the comparator 62.

When playing the NTSC system (second system) disc, for example, 21 scanning lines are reproduced every time one pulse is produced from the magnetic detector 63. This is because the NTSC system color video signal having 525 scanning lines is converted into a predetermined signal format and is recorded on the analog recorded track turns at a rate of four fields per revolution of the disc, and 1050 scanning lines are recorded on one analog recorded track turn. For this reason, when playing this NTSC system disc, the comparator 62 receives the output pulse signal of the frequency divider 59 through the switching circuit 61 which is connected to the terminal N, which output pulse signal has a period which is 21 times the horizontal scanning period (H), and the output pulses of the magnetic detector 63 having a period of 21H. The comparator 62 produces an error voltage which is responsive to the phase error between the two pulse signals supplied thereto, and this error voltage is applied to the motor 38 through a motor driving amplifier 66.

On the other hand, when the disc 34 to be played is the disc 24, 25 scanning lines are reproduced every time one pulse is produced from the magnetic detector 63. This is because the PAL or SECAM system color video signal having 625 scanning lines is converted into a predetermined signal format and is recorded on the analog recorded track turns at a rate of four fields per revolution of the disc 24, and 1250 scanning lines are recorded on one analog recorded track turns. Hence, when playing the disc 24, the comparator 62 receives the output pulse signal of the frequency divider 60 through the switching circuit 61 which is connected to the terminal P, which output pulse signal has a period of 25H, and the output pulses of the magnetic detector 63 having a period of 25H. The comparator 62 produces an error voltage which is responsive to the phase error between the two pulse signals supplied thereto, and this error voltage is applied to the motor 38 through the motor driving amplifier 66.

Thus, the rotational speed of the motor 38 is controlled so that the horizontal scanning frequency reproduced from the disc 34 is the same as the frequency (15.734 kHz in this case) of the signals supplied to the frequency dividers 59 and 60. As a result, the motor 38 is rotated at a rotational speed of 899.1 rpm when playing the NTSC system disc. On the other hand, the motor 38 is rotated at a rotational speed of 755.24 rpm which is 144/143 times the original rotational speed of 750 rpm when playing the disc 24.

When the operator pushes a start switch of the input device 39 after the motor 38, the turntable 37, and the disc 34 (24) have started to rotate, a signal which causes a feed mechanism 67 to move in the inner peripheral direction of the disc 34 is produced through the command processor 40 and the microprocessor 41. A reproducing stylus 68 which is fed by the feed mechanism 67, thereafter makes sliding contact with disc 34. The disc 34 has an electrode function, and an electrode is formed on the reproducing stylus 68. Thus, an electrostatic capacitance is formed between the disc 34 and the electrode of the reproducing stylus 68, and this electrostatic capacitance varies according to variations in the geometrical configuration of the recorded tracks. The variations in the electrostatic capacitance is picked up and converted into an electrical signal according to a known method in a pickup circuit 69.

The reproduced signal (RF signal) obtained from the pickup circuit 69, is supplied to a known tracking servo circuit 70. The tracking servo circuit 70 discriminates and separates the reference signals fp1 and fp2, detects the envelopes of the reference signals fp1 and fp2, and differentially amplifies the detected envelopes so as to produce a tracking error signal. The tracking error signal is applied to a tracking coil 71 which controls the reproducing stylus 68 so that the reproducing stylus 68 constantly scans over the recorded track without tracking error. As a result, the stylus tip of the reproducing stylus 68 is minutely displaced in the width direction of the track, instant by instant, depending on the tracking error.

The reproduced signal from the pickup circuit 69 is supplied to an information signal reproducing circuit 85. The reproducing circuit 85 frequency-demodulates the second FM signal which is reproduced from the analog recorded tracks, so as to obtain the composite video signal which is in conformance with the NTSC system and the audio signal. The reproduced composite video signal is produced through an output terminal 86, and the reproduced audio signal is produced through an output terminal 87.

Further, the reproduced signal from the pickup circuit 69 is supplied to a demodulator 72 within the adapter part 36, through the pin terminals $43_2$ and $44_2$. The demodulator 72 frequency-demodulates the reproduced signal, and supplies a demodulated signal to a vertical synchronizing signal detecting circuit 73, an address data write-in circuit 74, and the digital signal demodulating circuit 56. As described before, the master clock signal obtained from the switching circuit 46 and having the frequency of 6.1678 MHz, is supplied to the digital signal demodulating circuit 56, and the digital signal demodulating circuit 56 detects the existence of an error by use of the error detecting code CRC within the demodulated digital signal which is reproduced from the digital recorded track turns and has the signal format shown in FIG. 2. When it is detected that the error does exist within the demodulated digital signal, the digital signal demodulating circuit 56 corrects the error by use of the error correcting codes P and Q. Further, the digital signal demodulating circuit 56 supplies the digital audio signals which are transmitted in the positions Ch-1 through Ch-4 shown in FIG. 2, to a digital-to-analog (D-A) converter and switching device 75. On the other hand, in the case where the digital video signal is transmitted in at least one of the positions Ch-3 and Ch-4 shown in FIG. 2, the digital signal demodulating circuit 56 supplies the digital video signal to a still picture decoder 76. The D-A converter and switching device 75 subjects the digital audio signals to a digital-to-analog conversion, and is switched and controlled in response to an output of an address data write-in circuit 77.

The still picture decoder 76 produces an analog video signal of the desired standard television system, related to the original still picture, from the digital video signal which is supplied thereto. This analog video signal from the still picture decoder 76 is produced through an output terminal 78. The address data write-in circuit 77 writes therein the address data of the address signal having the signal format shown in FIG. 3, by storing the 1-bit signal which is located at the position Adr shown in FIG. 2 and is obtained from each block. The address data written in the address data write-in circuit 77, is supplied to a terminal D of a switching circuit 79, and to the D-A converter and switching device 75. The D-A converter and switching device 75 produces a switching signal based on the address data from the address data write-in circuit 77, produces only the audio signals through two or more output terminals among output terminals 80 through 83. In other words, when a 4-channel audio signal is reproduced from the disc 34, the audio signals of the four channels are produced through all of the output terminals 80 through 83. When a 3-channel audio signal is reproduced from the disc 34, the audio signals of the three channels are produced through the output terminals 80 through 82. Further, when two kinds of 2-channel audio signals are reproduced from the disc 34, the audio signals of the two channels in one selected kind of 2-channel audio signal are produced through the output terminals 80 and 81 (or 82 and 83).

The address data write-in circuit 74 discriminate and separates the address signal within the signal which is reproduced from the analog recorded track turns, and writes therein the address data of the separated address signal. The written address data is applied to a terminal AN of the switching circuit 79. The vertical synchronizing signal detection signal from the vertical synchronizing signal detecting circuit 73, and the detection signal from the digital signal demodulating circuit 56 indicating the error detection result by the use of the error detecting code CRC, are respectively supplied to a discriminating circuit 84. In a period in which the vertical synchronizing signal detection signal is not supplied to the discriminating circuit 84 and the detection signal supplied to the discriminating circuit 84 from the digital signal demodulating circuit 56 indicates that there is no error, the discriminating circuit 84 discriminates that the digital recorded track is being reproduced and connects the switching circuit 79 to the terminal D. On the other hand, in a period in which the vertical synchronizing signal detection signal is supplied to the discriminating circuit 84 and the detection signal supplied to the discriminating circuit 84 from the digital signal demodulating circuit 56 indicates that there is an error, the discriminating circuit 84 discriminates that the analog recorded track turn is being reproduced and connects the switching circuit 79 to the terminal AN.

Accordingly, the output address data of the address data write-in circuit 74 is obtained from the switching circuit 79 while the analog recorded track turn is being reproduced. On the other hand, the output address data of the address data write-in circuit 77 is obtained from the switching circuit 79 while the digital recorded track turn is being reproduced. The reproduced address data obtained from the switching circuit 79, is supplied to the command processor 40 and the microprocessor 41 within the player part 35, through the pin terminals $44_1$ and $43_1$. The command processor 40 constantly displays the position of the reproducing stylus 65 with the address data which is designated. The microprocessor 41 produces various kinds of signals based on the signals from the input device 39 and the input address data, and supplies the various kinds of signals to the feed mechanism 64. For example, during a random access, the reproducing stylus 65 is moved at a high speed to the track position having the address which is designated by the input device 39.

Hence, even in the case where the disc 34 is the disc 24 on which the digital recorded track turns and the analog recorded track turns coexist, it is possible to satisfactorily reproduce the signals from the recorded track turns on the disc 34.

In a case where the disc 34 is the conventional digital audio disc (fifth disc) comprising solely of the digital recorded track turns, the switching circuits 46 and 47 are connected to the respective terminals A in response to the output signal of the status decoding circuit 45. In this case, the output signal of the oscillator 49 having the frequency of 6.174 MHz, is produced from the switching circuit 46 and is supplied to the digital signal demodulating circuit 56 as the master clock signal. In addition, the output signal of the frequency divider 50 having the frequency of 15.75 kHz, is produced from the switching circuit 47 and is supplied to the frequency dividers 59 and 60 as the motor rotation synchronizing signal, through the pin terminals $44_7$ and $43_7$ and the switching circuit 57.

In the case where the disc 34 being played is the fifth disc, the switching circuit 61 is connected to the terminal N. Hence, the signal which is frequency-divided by 1/21 in the frequency divider 59 and has the frequency of 750 Hz, is supplied to the comparator 62. As a result, the motor 38 is rotated at a rotational speed of 900 rpm. In addition, when playing the fifth disc, the switching circuit 79 is constantly connected to the terminal D. The switching circuit 79 is constantly connected to the terminal AN when playing the video disc (second or fourth disc).

When playing the NTSC system disc, the switching circuit 61 may be connected to the terminal N and the switching circuits 46 and 47 may be connected to the respective terminals A. In this case, the NTSC system disc is rotated at a rotational speed of 900 rpm so that the horizontal scanning frequency is reproduced with a frequency of 15.75 kHz and the transmission frequency of the digital signals which are reproduced from the digital recorded track turns is equal to 44.1 kHz. The signals can be reproduced satisfactorily from the practical point of view in this case.

It was described heretofore that the disc 24 is recorded with the PAL or SECAM system (first system) composite video signal having a field frequency of 50 Hz and 625 scanning lines, on the analog recorded track turns thereof. However, the system according to the present invention may also be applied to a disc which is recorded with the NTSC system (second system) composite video signal having a field frequency of 59.94 Hz and 25 scanning lines, on the analog recorded track turns thereof. In this case, 2964 blocks of the digital signals are recorded on the digital recorded track turns per revolution of the disc with a transmission frequency of 44.416 kHz. When this disc is controlled to rotate at a rotational speed of 892.85 rpm in order to reproduced and display the signals reproduced from the disc on the first system monitoring reproducing apparatus, the digital signals are reproduced with a transmission frequency of approximately 44.1 kHz. This transmission frequency of 44.1 kHz is approximately the same as the transmission frequency with which the digital signals are reproduced from the first system disc (disc which is recorded with 3528 blocks of digital signals per revolution of the disc with a transmission frequency of 44.1 kHz) when the first system disc is rotated at an original rotational speed of 750 rpm.

It was described heretofore that the PAL or SECAM system color video signal, for example, is converted into a predetermined signal format and is recorded on the analog recorded track turns on the disc at a rate of four fields per revolution of the disc. However, the color video signal may be recorded on the analog recorded track turns on the disc at a rate of N fields per revolution of the disc, where N is a natural number greater than or equal to two. The present invention may also be applied to a case where the composite video signal is a black and white composite video signal having a field frequency of 50 Hz and 625 scanning lines. One revolution period of the disc on which the composite video signal is recorded on the analog recorded track turns at a rate of N fields per revolution of the disc and the digital signals are recorded on the digital recorded track turns, is naturally equal to a product of the vertical scanning period and N. The number of blocks of digital signals recorded on the digital recorded track turn per revolution of the disc, is selected to a product of the frequency of 43.75 kHz and one revolution period of the disc.

In addition, it was described heretofore that the system according to the present invention can compatibly play the existing digital audio disc and the existing video disc. However, the system according to the present invention may also play an optical type disc from which the recorded information is read by the use of a light beam. The system according to the present invention may of course play a disc of the type which is not recorded with the reference signals fp1 through fp3. Moreover, as proposed in the U.S. patent application Ser. No. 574,521 in which the assignee is the same as the assignee of the present application, the information signal which is recorded on the disc which is played by the system according to the present invention, may also include a program for carrying out an interactive control between the disc reproducing apparatus and an external device such as a personal microcomputer having a discriminating function.

The information signal recorded on the digital recorded track turns may be an information signal (a video signal, for example) which is other than the audio signal, in all of the four channels. For example, a video signal may be recorded in all of the four channels, to record on the disc the contents of an encyclopedia, a telephone directory, and the like.

Further, the present invention is not limited to these embodiments, but various variations and modifications may be made without departing from the scope of the present invention.

What is claimed is:

1. A recording and reproducing system for recording and reproducing signals on and from a rotary recording medium which is recorded with composite video signal of a predetermined television signal so that the rotary recording medium is compatibly playable on a reproducing apparatus which is primarily designed to play a rotary recording medium which is recorded with a composite video signal of another television system, said recording and reproducing system comprising:

recording means for recording signals on the rotary recording medium by forming analog recorded track turns and digital recorded track turns on the same surface of the rotary recording medium, said analog recorded track turns being recorded with a modulated signal, said modulated signal being a first information signal which at least includes the composite video signal of said predetermined television system and is subjected to an analog modulation, said digital recorded track turns being recorded with digital signals which are time-sequentially multiplexed in terms of blocks with a predetermined transmission frequency, each block of said digital signals at least including modulated digital data, said modulated digital data being a second information signal which is subjected to a digital modulation, said predetermined transmission frequency being selected so that a transmission frequency of the digital signals reproduced from said rotary recording horizontal synchronizing signal is reproduced from said rotary recording medium with the same frequency as a horizontal scanning frequency of said other television system;

reproducing means for picking up and reproducing recorded signals from the track turns of said rotary recording medium;

a first reproducing circuit for reproducing said first information signal from a reproduced signal which is received from said reproducing means;

a second reproducing circuit for reproducing said second information signal from the reproduced signal which is received from the reproducing means;

a master clock signal generating circuit for supplying to said second reproducing circuit a master clock signal having a constant frequency; and a control circuit for controlling a motor which rotates said rotary recording medium, responsive to a signal obtained from a part of said master clock signal generating circuit, so that a horizontal scanning frequency of the composite video signal is reproduced from said rotary recording medium with the horizontal scanning frequency of said other television system.

2. A recording and reproducing system as claimed in claim 1 in which said control circuit comprises switching means for switching the rotational speed of said motor so that the horizontal scanning frequency of the composite video signal is reproduced from said rotary recording medium with the horizontal scanning frequency of said predetermined television system.

3. A recording and reproducing system as claimed in claim 1 in which said master clock signal generating circuit comprises a fixed oscillator circuit, and a phase locked loop responsive to an output signal of said fixed oscillator circuit, for producing as the master clock signal a signal having a frequency which is a predetermined number multiple of said predetermined transmission frequency of said second information signal.

4. A recording and reproducing system as claimed in claim 1 in which said predetermined television system is one of the first system having a field frequency of 50 Hz and 625 scanning lines and the second system having a field frequency of 59.94 Hz and 525 scanning lines, and said other television system is the other of said first and second systems.

5. A recording and reproducing system as claimed in claim 1 in which said predetermined television system is a system having a field frequency of 59.94 Hz and 525 scanning lines, and said other television system is a system having a field frequency of 60 Hz and 525 scanning lines.

6. A recording and reproducing system as claimed in claim 1 in which said predetermined transmission frequency is extremely close to a frequency of 44.1 kHz which is a transmission frequency of digital signals recorded on an existing digital audio disc.

* * * * *